Jan. 16, 1951

E. S. CORNELL 2,538,295

THREAD SIZE GAUGE

Filed Jan. 9, 1947

Inventor
Elton S. Cornell
by
Wright, Brown, Quinby & May
Attys.

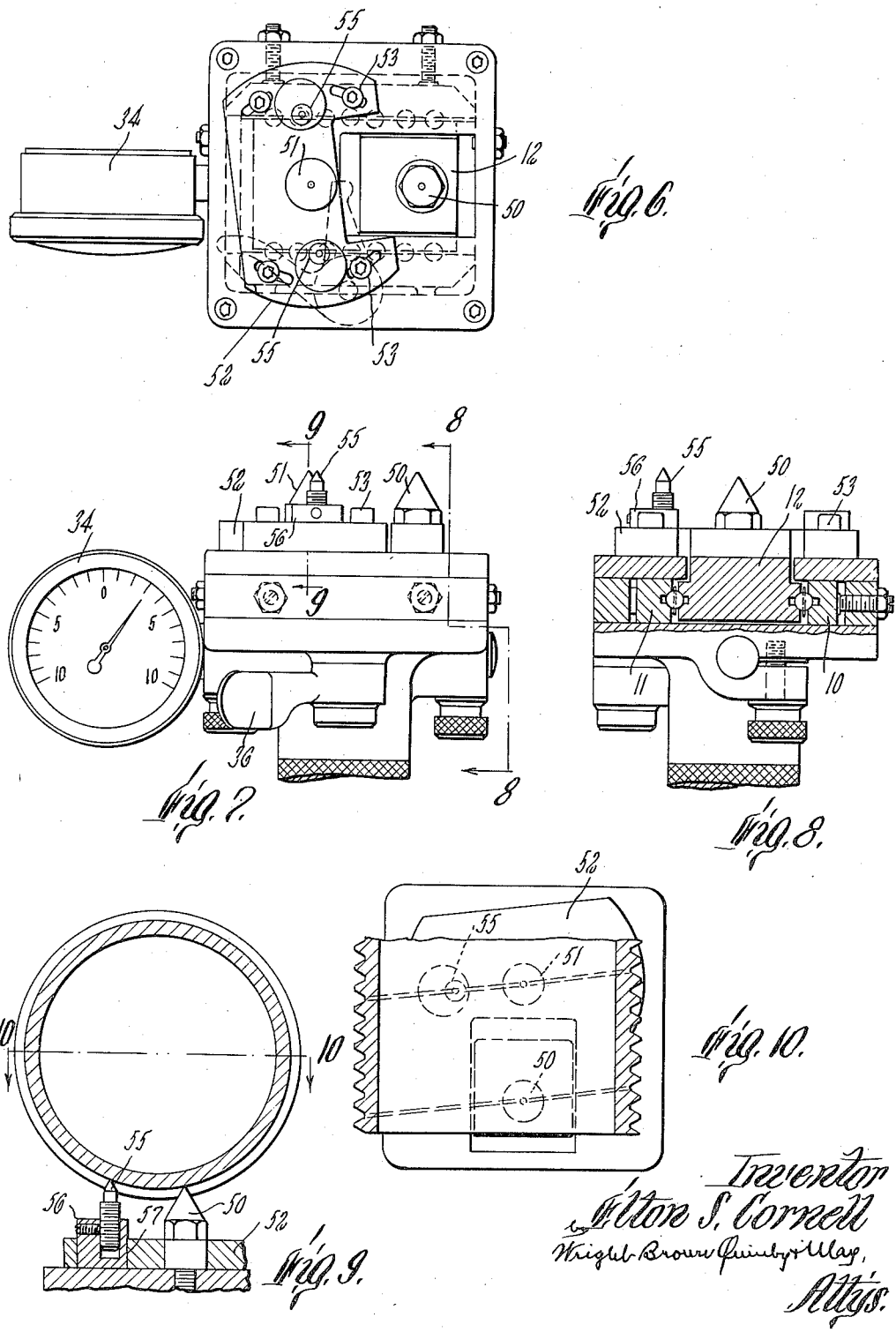

Patented Jan. 16, 1951

2,538,295

UNITED STATES PATENT OFFICE 2,538,295

THREAD SIZE GAUGE

Elton S. Cornell, Charleston, N. H., assignor to Bryant Chucking Grinder Company, Springfield, Vt., a corporation of Vermont Application January 9, 1947, Serial No. 721,027

2 Claims. (Cl. 33—199)

This invention relates to gages for measuring internal or external diameters or thread lead, and has for one object to provide such a gage having an improved mounting of a movable gaging anvil.

A further object is to provide such a gage particularly suitable for threaded work and which may be used to determine size, taper and out-of-roundness.

Another object is to produce a gage capable of detecting lead error.

Still another object is to provide a gage of small size which can be readily brought to the work piece where it is inconvenient to bring the work to the gage.

For a complete understanding of this invention, reference may be had to the accompanying drawings in which Figure 1 is a front elevation of an internal thread gage embodying the invention.

Figure 6 is a front elevation of a gage for gaging lead of external threads.

Figure 7 is a top plan of the gage of Figure 6.

Figure 1:
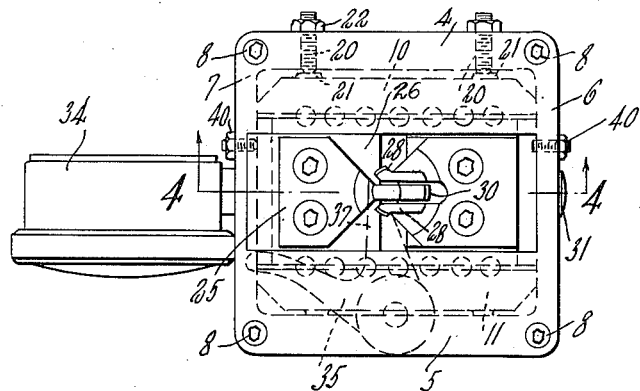
Figure 2:
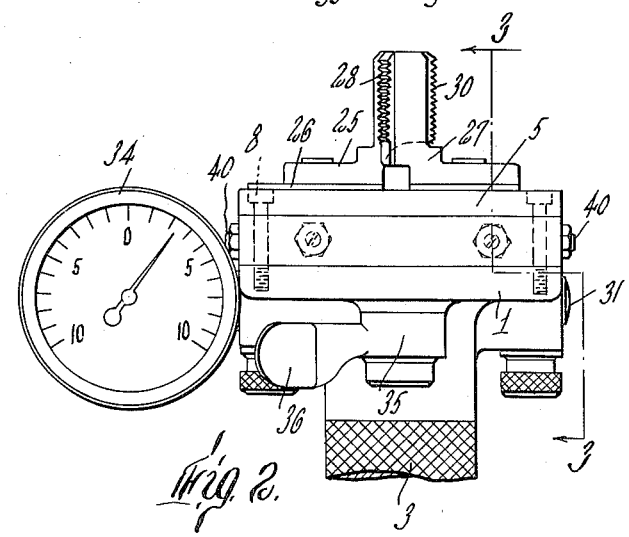
Figure 2 is a top plan view of the same.
Figure 3:
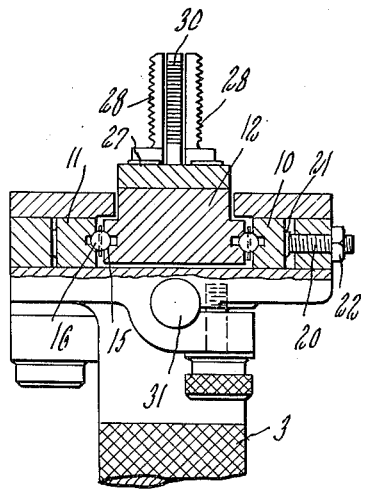
Figure 3 is a sectional view on line 3—3 of Figure 2.

Figures 8 and 9 are detail sectional views on lines 8—8 and 9—9, respectively, of Figure 7, Figure 9 also showing in section a threaded work piece to which the gage is in gaging relation.

Figure 10 is a detail sectional view on line 10—10 of Figure 9.

Referring first to Figures 1 to 4, at 1 is indicated a body having an extension 2, which is threaded into a suitable handle 3 shown as provided with a knurled exterior for ease in handling. This body 1 is provided with a flat end face to which are secured parallel ways 4 and 5 which may be formed as integral portions of a rectangular frame having end walls 6 and 7. This frame may be secured to the top face of the body 1 as by the screws 8.

Positioned between the parallel side guides 4 and 5 are a pair of shoes 10 and 11, and between these shoes there is mounted for rectilinear motion a slide 12. The confronting faces of the slide 12 and the shoes 10 and 11 are provided with longitudinal grooves forming ways 15 between which are positioned balls 16, the ways being so related that when the balls are in position, the slide 12 is out of contact with the face of the body 1 and is supported entirely by the balls.

These balls may be loaded to the desired extent and this may be accomplished by adjustment of a pair of screws 20 threaded through one of the parallel ways as 4 and engaging pads 21 on the outer face of the corresponding shoe. The shoes 10 and 11 are identical, the pads of the shoe 11 engaging directly against the wall 5. By tightening these screws 20 to the desired extent, the shoe 10 is pressed against the balls which are against the side of the slide 12, and the slide 12 is pressed toward the shoe 11 with the desired loading pressure. The screws 20 may be locked in adjusted positions by tightening of the check nuts 22.

Figure 4:
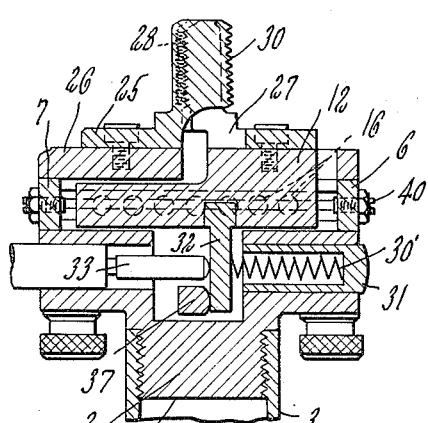
Figure 4 is a sectional view on line 4—4 of Figure 1.

The body 1 may have secured thereto a fixed anvil 25 as shown best in Figures 1 and 4, in which this anvil is adapted for use with internally threaded work. The fixed anvil is secured to a cover plate 26 which bridges over a portion of the slide 12. To the slide 12 is secured a mating gaging element 27. The gaging element 27 has a pair of prongs 28 having thread segments at their ends for engaging spaced portions of the threads of internally threaded work while the fixed anvil 25 has a single work-engaging portion 30. The slide 12 is urged in a direction to separate the anvils so as to press them into engagement with an internally threaded work piece, as by a spring 30' (see Figure 4) seated in a hollow plug 31 and engaging an element 32 secured to the slide 12 and projecting downwardly therefrom. This element 32 opposite to the spring 30' is pressed against the stem 33 of a dial indicator 34 carried by the body 1. A finger lever 35 having a finger portion 36 at one end and an angularly related element 37 which engages the lower end of the element 32, as shown in Figure 4, may be employed to press the slide 12 back against the pressure of the spring 30' to contract the gaging anvils so as to permit the ready insertion of the anvils into the threaded work to be gaged, the spring 30' being employed to provide the gaging pressure of the anvils against the work. This results in giving a uniform pressure of the anvils upon the work so that its gaging action is independent of any differences of action due to varying gaging pressures as might be produced with the gaging pressures produced by the operator. The range of motion of the slide 12 may be adjusted as desired as by end stop screws 40 threaded through the end wall members 6 and 7.

Figure 5:
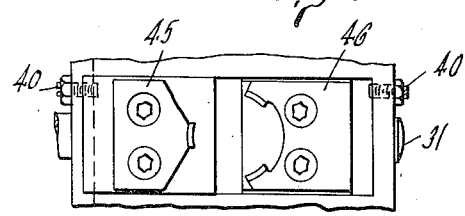
Figure 5 is a fragmentary front elevation similar to a portion of Figure 1, but showing the gage provided with anvils for gaging external work.

Instead of employing gaging anvils suitable for gaging internally threaded work, anvils suitable for gaging externally threaded work may be employed, this being shown in Figure 5, employing a fixed single point external gaging anvil 45 and a two point movable gaging anvil 46.

The same mounting may be employed when gaging the correctness of lead of an external screw, such an arrangement being shown in Figures 6 to 9. The slide 12 is then provided with a conical point 50 as a movable gaging element, and a similar fixed gaging point 51 may be carried by the body. As shown this is fixed to a plate 52 suitably secured by screw and slot connections 53 to the body for angular adjustment about the axis of the anvil 51 and also provided with one or two small conical anvils 55 mounted in cylindrical holders 56 held in circular holes 57 in the plate 52. By suitable angular adjustment of the plate 52 these points 55 may be adjusted with relation to the point 51 to conform with the correct lead angle of a work piece, one of the points 55 being employed for gaging right hand threads and the other for gaging left hand threads. If the point 51 and the proper point 55 for the direction of thread be applied in the thread groove with the support 56 adjusted to the correct lead angle, the point 50 will then engage the diameter of the thread spaced from the point 51 by a thread multiple and with the two points 50 and 51 parallel to the axis of the work, this relationship of the parts being shown in Figure 10. Any departure from correct lead of the threads where the points 51 and 55 are engaged therewith will act to throw the point 50 on one or the other side of proper alinement with the point 51 axially of the work, thus indicating lead error, and any inaccuracy in spacing between the points 50 and 51 will be shown on the indicator 34 which is in operative relation to the slide 12 as previously described. Variations in reading of the gage on relative turning between the gage and the work piece about the axis of the threaded portion will indicate out-of-roundness of the work, and variation in gage reading when the gaging anvils engage well into or onto the work, and where they engage the work nearer to one end only may indicate taper of the work. Preferably the parts are so arranged that when the lead is correct the movable anvil will be moved away from an idle position, the indicator pointer moving to zero from a position at one side of zero.

From the foregoing description of certain embodiments of this invention, it will be evident to those skilled in the art that various changes and modifications might be made without departing from its spirit or scope.

I claim:

1. A gage comprising a body having parallel wall portions, a slide supported for rectilinear motion between said wall portions, a fixed conical anvil carried by said body, a movable conical anvil carried by said slide spaced from said fixed anvil in the direction of motion of said slide, a plate angularly adjustable about the axis of said fixed anvil and secured to said support, and a conical anvil carried by said plate at one side of a line connecting said fixed and movable anvils and adjustable by the adjustment of said plate relative to the perpendicular to said line and to said fixed anvil to conform to the lead angle of a standard thread corresponding to the work to be tested.

2. A gage comprising a body having a way, a slide supported for rectilinear motion along said way, a fixed anvil carried by said body, an anvil carried by said slide spaced from said fixed anvil in the direction of motion of said slide, a plate angularly adjustable about the axis of one of said anvils, an anvil carried by said plate at one side of said one anvil, and means for securing said plate in adjusted angular position with said plate-carried anvil and said one anvil arranged to conform to the lead angle of the threads to be tested when said fixed and slide-carried anvils are arranged parallel to the axis of the threaded work.

ELTON S. CORNELL.

REFERENCES CITED

The following references are of record in the file of this patent:

UNITED STATES PATENTS

| Number | Name | Date |
|---|---|---|
| 1,423,339 | Ledell | July 18, 1922 |
| 1,533,671 | Steele | Apr. 14, 1925 |
| 1,625,462 | Frauenthal | Apr. 19, 1927 |
| 2,233,626 | McClure | Mar. 4, 1941 |
| 2,258,760 | Hecker | Oct. 14, 1941 |
| 2,424,338 | Sonntag | July 22, 1947 |
| 2,427,924 | Rose | Sept. 23, 1947 |
| 2,440,967 | Moore | May 4, 1948 |